Figure 1:
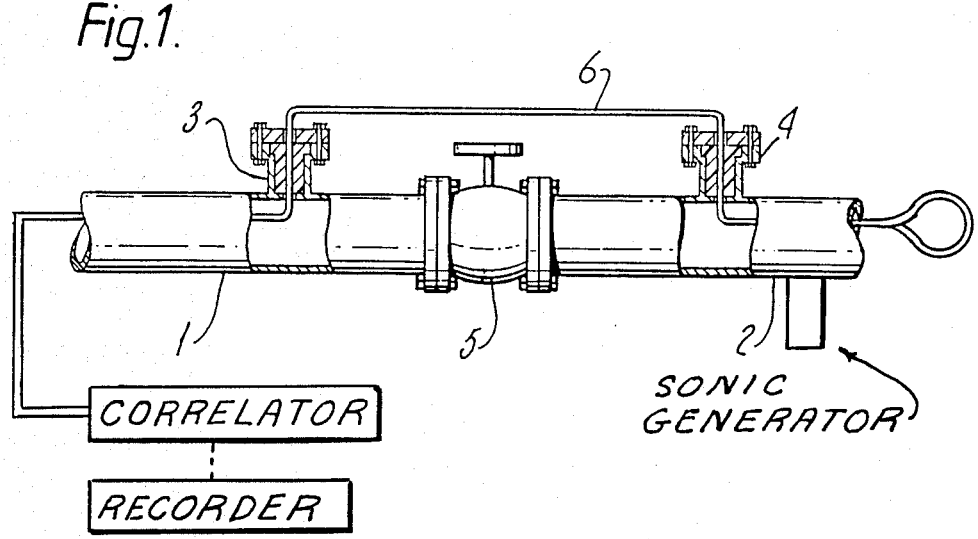

United States Patent [19]

Weir

[11] Patent Number: 4,747,309

[45] Date of Patent: May 31, 1988

[54] STRUCTURES AND METHODS OF TESTING THEM WITH LINEAR MICROPHONES

[75] Inventor: Robert J. Weir, Richmond, England

[73] Assignee: Imperial Chemical Industries PLC, London, England

[21] Appl. No.: 306,343

[22] Filed: Sep. 28, 1981

[30] Foreign Application Priority Data

Oct. 2, 1980 [GB] United Kingdom ............... 8031745

[51] Int. Cl.⁴ ............................................ G01N 29/04
[52] U.S. Cl. .................................... 73/655; 73/657; 73/40.5 A; 73/49.1; 340/555; 340/557; 350/358
[58] Field of Search ............... 367/149, 154, 155, 169, 367/170; 73/655, 657, 643, 40.5 A, 49.1, 49.5, 592, 653, 800, 705; 350/358; 340/555, 556, 557, 566, 567, 621

[56] References Cited

U.S. PATENT DOCUMENTS

| | | | |
|---|---|---|---|
| 3,803,548 | 4/1974 | Skujins, Jr. | 340/566 |
| 4,071,753 | 1/1978 | Fulenwider et al. | 73/655 |
| 4,115,753 | 9/1978 | Shajenko | 73/655 X |
| 4,162,397 | 7/1979 | Bucaro et al. | 73/655 X |
| 4,193,130 | 3/1980 | Young et al. | 367/149 |
| 4,265,122 | 5/1981 | Cook et al. | 73/655 X |
| 4,289,019 | 9/1981 | Claytor | 73/40.5 A |
| 4,295,738 | 10/1981 | Meltz et al. | 73/800 |
| 4,297,887 | 11/1981 | Bucaro | 73/655 |
| 4,310,905 | 1/1982 | Palmer | 367/149 X |
| 4,311,391 | 1/1982 | Gilmour | 73/655 X |
| 4,313,185 | 1/1982 | Chovan | 73/657 X |
| 4,319,186 | 3/1982 | Kingsley | 73/657 X |
| 4,342,229 | 8/1982 | Massa | 73/579 |
| 4,342,907 | 8/1982 | Macedo et al. | 73/655 |
| 4,363,114 | 12/1982 | Bucaro et al. | 73/657 X |

FOREIGN PATENT DOCUMENTS

| | | |
|---|---|---|
| 1284756 | 12/1968 | Fed. Rep. of Germany ... 73/40.5 A |
| 868610 | 5/1961 | United Kingdom . |
| 1175855 | 1/1970 | United Kingdom . |
| 1486377 | 9/1977 | United Kingdom . |
| 1525334 | 9/1978 | United Kingdom . |
| 1527287 | 10/1978 | United Kingdom . |
| 1536340 | 12/1978 | United Kingdom . |
| 1544483 | 4/1979 | United Kingdom . |

OTHER PUBLICATIONS

Optical Fiber Acoustic Sensor Utilizing Mode-Mode Interference, by Layton and Bucaro; Applied Optics, vol. 18, No. 5, Mar. 1, 1976, p. 666.

Measurement of Sensitivity of Optical Fibers for Acoustic Detection, by Bucaro et al., Applied Optics, vol. 18, No. 6, Mar. 15, 1976, p. 938.

Primary Examiner—Howard A. Birmiel
Attorney, Agent, or Firm—Cushman, Darby & Cushman

[57] ABSTRACT

Structures, for example pipe-lines and chemical process equipment, are provided with linear microphones sensitive to vibration associated with the structure. By monitoring the modulation of carrier signals in the microphone actual or incipient faults in the structure are detected.

6 Claims, 1 Drawing Sheet

STRUCTURES AND METHODS OF TESTING THEM WITH LINEAR MICROPHONES

This invention relates to structures and methods of testing them.

Structures, for example vessels for storing processing and/or conveying fluids, for example reactors in chemical plants, distillation columns, pipe-lines, storage vessels and the like are normally tested when they are first installed. After installation faults may however develop; for example corrosion or erosion may take place, fractures due to mechanical stresses or the shifting of support for the structure, especially, in the case of long distance pipe-lines laid in the ground, of subsidence, or other mechanical and or physical deterioration may occur.

Certain defects produce or modify vibration which may be detected in the region of the defect; for example if a fluid leak occurs from a pipe-line or pressure vessel it will generate sonic vibration, or if sonic vibration is imparted to the structure for example by flexing or striking it the transmission of the sonic vibration may be affected by a defect which has developed in the structure.

The invention comprises a structure, for example a structure for holding processing and/or conveying fluid, and at least one linear microphone sensitive to vibration on in or from the structure. By vibration we include sonic, infra-and ultrasonic vibration.

Linear microphones are elongated members capable of conducting a carrier signal, especially electric current or electromagnetic radiation, the transmission of which is sensitive to exposure of the member to vibration, especially sonic or ultrasonic vibration. Thus if the member is exposed to vibration at one or more points along its length, a phase and/or amplitude change occurs in the carrier signal.

Suitably the linear microphone may comprise as its elongated member one or more optical fibres which are sensitive to sonic or ultrasonic vibration, and means for passing electromagnetic radiation, especially light, from a source to a detector through the fibres. The radiation is preferably light in the visible or infra red range up to $25\mu$ in wavelength. By optical fibre we include all fibrous conductors of electromagnetic radiation.

If the structure is a pipe-line, a linear microphone is laid on the surface of or through or close to the pipeline and a fault in the pipe-line is detected by a phase change and/or amplitude change in an electric current or electromagnetic wave transmitted through the elongated member.

The position of the fault may be determined by causing one or more carrier signals to pass through one or more linear microphones in opposite directions and determining the time lag necessary to produce an optimum correlation of the signal modulations produced in each direction. Form this time lag and the speed of propagation of the carrier signal in the linear microphone(s) the position of the fault may be calculated.

If it is wished to use only one carrier signal, it may be passed back through the same linear microphone if the latter comprises an optical fibre and the signal is electromagnetic radiation by looping the far end of the fibre or reflecting the signal. The received signal is thus similarly modulated twice and the time lag by which the successive modulations are transported is determined. If two different carrier signals and linear microphones are used each signal is modulated only once and the correlation is between two separate modulations; however, and allowance must be made for the time taken to transmit the signals or counterparts thereof for example electrical analogues thereof to the point where the correlation is carried out.

If desired provision may be made of an alternative indication of the position of a fault in the event of breakage of the elongated member in a catastophe, for example violent breakage of a section of the pipe-line severing the elongated member or a fire in the pipe-line destroying it, by providing for the transmission of characteristic signal from successive points along the pipe-line through the same or different linear microphone(s).

A catastrophe at any point along the line will thus cut off signals characteristic of points remote from the catastrophe whilst leaving those characteristic of points closer than the catastrophe, thus giving an approximate position of the catastrophe. The signals may be characteristic in their frequencies, or may be intermittent signals characterized by their repeat intervals or durations or may be characteristic in that they pass through a different linear microphone.

The invention may also be used in on-line testing of vessels. In this form of the invention a vessel is provided with one or more linear microphones in sonic communication with its wall and vibration in the wall is monitored. Suitably means is provided to impart a shock to the vessel and to record the modulation of the micrphones' carrier signals with time. By comparing the signals recorded when the vessel is in good condition with those recorded subsequently it is possible to monitor changes in the signals and thereby to detect incipient faults in the vessel. In this form of the invention an array of linear microphones is suitably disposed on the surface of the vessel.

This invention will now be described with reference to

Figure 2:
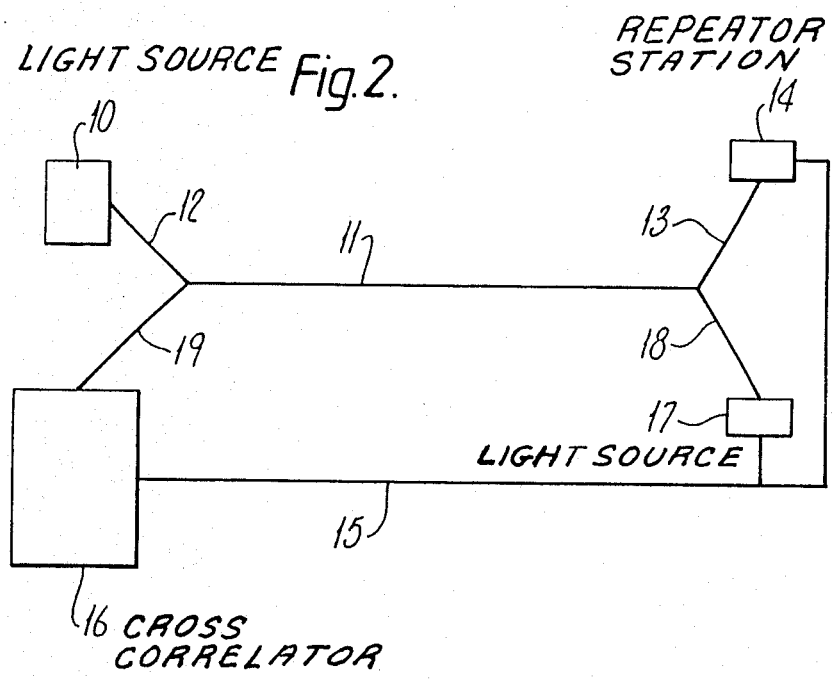

FIG. 1 which shows a portion of a pipe-line (the structure to be tested) in cross section and an optical fibre serving as a linear microphone associated with it, and also with reference to FIG. 2 which is a diagrammatic representation of the test system.

FIG. 1 shows a junction between pipe-line sections 1 and 2 each of which are provided with adjacent instrumentation branches 3 and 4 and which are joined by control valve 5 (represented diagrammatically). A optical fibre 6 passes through a seal in each instrumentation branch to by-pass the control valve 5, but otherwise it lies within pipe-line sections 1 and 2.

If a pipe-line which is not closable by intermediate valves is to be tested the optical fibre may be run through the whole length of the pipe-line. Suitably the optical fibre may in such a case by drawn through the pipe-line by a pig. If repeated pigging is necessary or if the pipe-line is closed by valves which are not readily by-passable the optical fibre may be laid externally along the length of the pipe-line.

Referring to FIG. 2, a light source 10 passes light alaong one limb 12 of the optical fibre 6 which branches into two limbs at each end. The non-branched part of the optical fibre lies along the pipe-line as described with reference to FIG. 1. Outlet limb 13 of optical fibre 11 passes to repeater station 14 from which an amplified signal is returned through a separate optical fibre 15 to cross correlation 16. A second light source 17 passes light back through optical fibre 11 by means of its outlet limb 18 and this signal is passed to cross correlator 16 through the second inlet limb 19. If desired the optical signal may be converted to an electrical analoge or digital signal at the outlet end of the optical fibre and may be transmitted along a conventional electrical cable. The cross correlation unit comprises photocells for converting the light signals into electrical signals, a correlator for storing zero crossings of the detector, and a shift register to store the pattern of zero crossings together with a variable clock for shifting one of the patterns to achieve an optimum match. The delay associated with the optimum match is displayed directly or after conversion to another convenient form for example a distance indication.

In operation, if sound is produced in the pipe-line due to a leak, the light signals passing through the optical fibre 11 are modulated and the match between the modulations of the light signals proceeding in opposite directions indicates the position of the leak.

If desired several optical fibres may be employed. In order to ensure that a signal is given in the event of a breakage of the fibres, characteristic signals may be generated at successive stations along the fibres and monitored at either or both ends of the pipe-line. The disappearance of some of the characteristic signals indicates a breakage of the fibres beyond the position of the station generating the last of the detected signals. Such characteristic signals may be of characteristic frequency or may be intermittent signals of characteristic repeat time, duration and or frequency.

If desired a simpler system may be employed, in which the optical fibre is looped at its far end and the light returned to an auto correlator along the same path. The auto correlator in this case is adapted to determined the time delay between successive matching modulations of the originating light.

It may be desirable to use electromagnetic radiation of two or more wavelengths as carrier waves in optical fibres in order to discriminate between fibre defects and modulations due to vibration.

It may be possible if a clean break in the fibre occurs to reflect a carrier wave from it and to determine the distance to the break from the time taken for the reflected wave to return.

I claim:

1. A structure which comprises means for testing said structure for faults, said means comprising at least one linear microphone which comprises an optical fibre sensitive to vibration from the structure, means for passing at least one carrier signal through the linear microphone in opposite directions and means to determine the position of a fault in the structure by determining the time lag necessary to produce an optimum correlation of the signal modulations produced in each direction.

2. A structure as in claim 1 wherein said structure includes a pipeline and wherein said linear microphone is laid along a substantial length of the pipeline.

3. A structure as claimed in claim 1 in which a single carrier signal is passed through the optical fibre and back through the same optical fibre and means is provided for determining the time lag by which successive matched modulations are transposed.

4. A pipeline as claimed in claim 1 which comprises means to transmit characteristic signals from successive points along the pipeline through the same or different linear microphones.

5. A structure as claimed in claim 1 wherein the linear microphone is sensitive to sonic or ultrasonic vibration and including means for passing light from a source to a detector through the optical fibre.

6. A structure as claimed in claim 5 in which the light is in the visible or infrared range up to $25\mu$ in wave length.

* * * * *